Jan. 2, 1945. H. D. HINELINE 2,366,621
ALTITUDE INDICATING SYSTEM
Original Filed Aug. 30, 1932 3 Sheets-Sheet 1
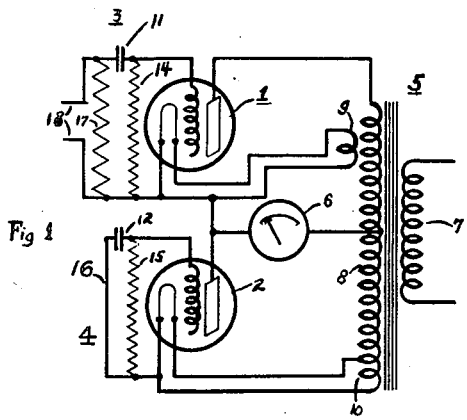
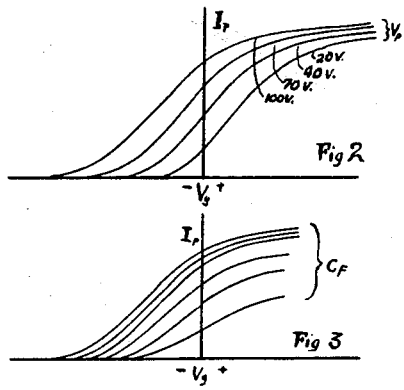
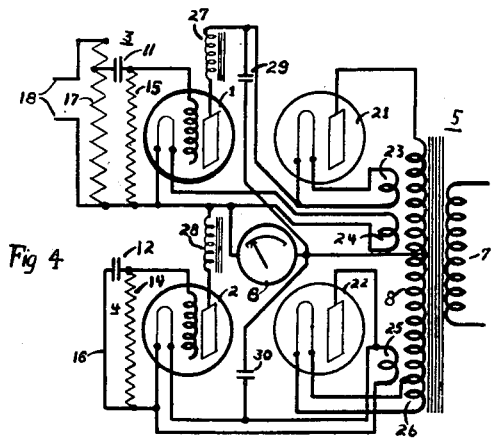
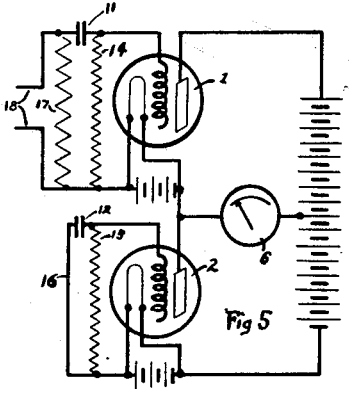
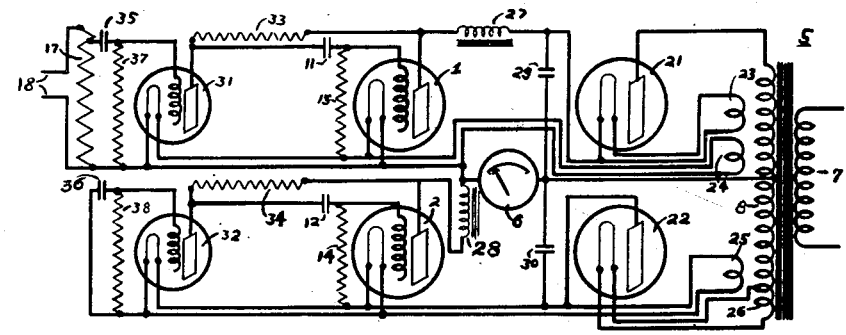
Inventor
Harris D. Hineline Jan. 2, 1945.  H. D. HINELINE  2,366,621
ALTITUDE INDICATING SYSTEM
Original Filed Aug. 30, 1932    3 Sheets-Sheet 3

INVENTOR.

Patented Jan. 2, 1945

2,366,621

UNITED STATES PATENT OFFICE 2,366,621

ALTITUDE INDICATING SYSTEM

Harris D. Hineline, Mount Vernon, N. Y.

Original application August 30, 1932, Serial No. 631,026. Divided and this application November 27, 1939, Serial No. 306,339

20 Claims. (Cl. 250—1)

This invention relates to amplifier systems, particularly of the vacuum tube type, and to the combination of an amplifier with a photo-electric cell.

My invention further relates to electrical measuring devices and particularly to amplifying measuring devices responsive to small values of electrical energy. It has for an object the utilization of vacuum tube systems for the measurement of the various units of electric currents, and the provision of means associated therewith for stabilizing the operation of the vacuum tubes, so that the unavoidable variations of the energizing power currents will not affect the operation of measurement, nor affect the reading obtained. It also has for objects the measurement of the altitude of aerial navigational devices such as airplanes and airships to show the actual altitude of the vehicle above the earth's surface, and the distance from the airship to an obstruction along a line at a given angle with the horizontal by the generation of modulated radio frequency energy on the vehicle, the directive radiation of that energy toward the earth's surface, the reflection of that energy at the earth's surface, the reception of reflected energy at the vehicle and the comparison of the phase relationship between the radiated energy and the received energy.

In the art of the measurement of the various electrical units of energy satisfactory instruments have been devised for the measurement of all values of the various direct current units and for the measurement of substantial amounts of the units of alternating current. Much difficulty has however been encountered in the measurement of small values of alternating current, voltage, wattage, and of certain of the more complex units. This difficulty occurs because of the fact that substantial amounts of current are required, when the currents are alternating, to provide alternating magnetic fields of sufficient strength to develop the necessary torque for moving an indicating pointer. Many attempts have been made to reduce the torque required but with relatively little success.

It has also been suggested that the alternating current be amplified, before being measured, by the well-known triode vacuum tube. This however has not been previously practicable because of the instability of the vacuum tube and the changes in its operation which occur with a change of current in the energizing power supplies.

My invention provides means for the utilization of vacuum tubes for the measurement of alternating currents or small electrical values of any of the various units and means for compensating for the change in operation of the vacuum tube with change in value of the energizing power supply thereto. My invention further utilizes a simple, inexpensive, accurate direct current meter for the indication of the value of the alternating current to be measured. I thus utilize the vacuum tube as an amplifying and converting means whereby a given value of electric current energy is converted into a much larger proportionate value of direct current energy, independently of power supply changes, which is conveniently, accurately, and easily measured by the simple inexpensive meter.

This I do by providing two similar vacuum tubes, connected in sequence, and with a power supply, such that current flows through the electron streams of the tubes in series. I further connect a simple direct current meter, which may conveniently be of the D'Arsonval type, between the midpoint of the power supply and the point of connection between the successive tubes, and apply the current to be measured to the grid of one of the tubes, for the simple measurements, and to both grids for various of the more complex units.

It is well known the slope of the characteristic curve of the triode vacuum tube showing the changes in plate current with respect to grid voltage is substantially constant over a considerable range of plate voltages and that likewise the slope of this curve is unaffected by changes in filament-current, and filament-temperature, for a substantial range, as long as the filament-current does not fall below a minimum value. The device of my invention utilizes the properties of one vacuum tube to compensate the irregularities in another produced by changes in the power supply. The current to be measured is then applied to the tubes and a differential current obtained which is caused to energize the meter.

An object of this invention is to amplify uniformly a maximum range of frequencies.

Another object is to amplify uniformly a range of frequencies greater than the audible range.

A further object is to couple amplifier tubes in cascade with direct conductive connections from plate to grid of successive tubes.

This application is a division of my co-pending application Serial No. 631,026, now Patent No. 2,189,582, which in turn is a continuation in part of my application Serial #394,596, filed September 23, 1929.

The system of this invention provides a combination of vacuum tubes and a resistance network of such character that the potential gradient established between successive points in the network corresponds to the voltage drop in the successive tubes, and sets the potential of the respective grids at the desired value. The system further provides a power supply for a light sensitive cell, and simple means for a direct conductive connection between the input grid of the amplifier and the cell, adapted to determine the potential of the connected grid. It also provides simple means for boosting the input to the connected grid.

Other objects and structural details of the device of this invention will be apparent from the following description, when read in connection with the accompanying drawings; wherein Fig. 1 is a diagrammatic representation of circuits and apparatus embodying a simple form of my invention;

Fig. 2 is a family of characteristic triode curves of change of plate current with change of grid voltage for various plate voltages;

Fig. 3 is a family of characteristic triode curves of change of plate current with change of grid voltage for various values of filament current;

Fig. 4 is an embodiment of my invention utilizing separately rectified alternating current for the power supply;

Fig. 5 is a simple form of my invention utilizing batteries for power supply;

Fig. 6 is a form of my invention utilizing auxiliary vacuum tubes for preliminary amplification for measurement of very small values;

Figure 7:
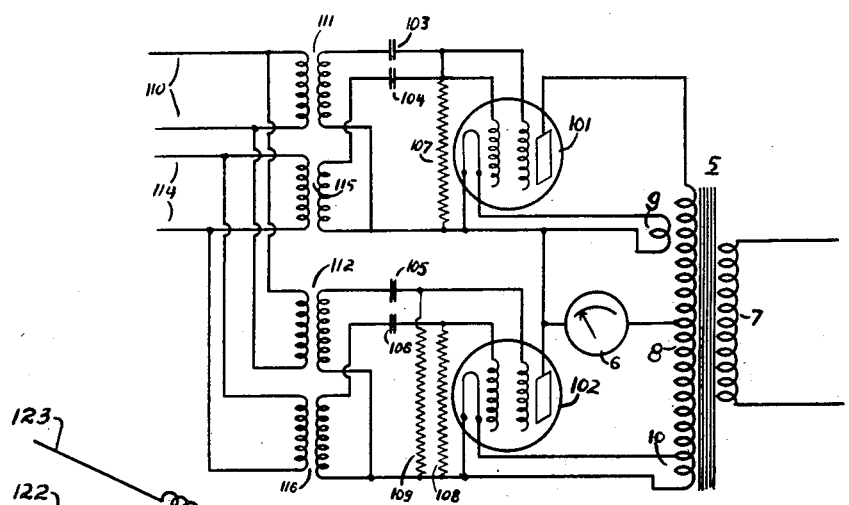
Fig. 7 shows an embodiment for the measurement of phase displacement or synchronism.

Referring to Fig. 1 which shows a simple embodiment of my invention, I provide triode vacuum tubes 1 and 2 having grid circuits 3 and 4, a transformer 5 and a direct current meter 6. The transformer 5 has a primary coil 7, a main secondary coil 8 having a mid tap, and an auxiliary secondary coil 9, insulated from coil 7, and another auxiliary coil 10, connected to the coil 7. The filament of the triode 1 is connected to the auxiliary secondary coil 9, and the filament of the triode 2 is connected to the auxiliary secondary coil 10 as indicated. The plate of the triode 1 is connected to the end of the secondary of the transformer 5, opposite to the end connected to the coil 10, and the plate of the triode 2 is connected to the filament circuit of the triode 1. This connection provides a self rectifying circuit from the secondary of the transformer through the triode 1 and the triode 2 in series, and back to the other end of the transformer secondary. A midpoint tap is provided at the midpoint of the secondary 8 and the meter 6 is connected to the junction between the plate of the triode 2 and the filament circuit of the triode 1. The meter 6 may be an indicating meter of the simple d'Arsonval type or may be of any more elaborate type desired, such as a recording meter, or contact making meter, relay, or other forms. The grid circuits of both triodes 1 and 2 are provided with grid condensers 11 and 12 and grid leaks 14 and 15, for the production of substantially equal biases on the grids of the respective tubes. One of the grid circuits, which may desirably be that of triode 2, is provided with a direct connection 16 from the condenser to the filament circuit so that no fluctuating current is impressed upon the grid to which it is connected. The other grid circuit is provided with a meter shunt 17 and input terminals 18 which are adapted to be connected to the source of the current which it is desired to measure. The current to be measured is then passed through the meter shunt 17. One end of the shunt may be connected to the filament circuit of the triode 1, and the other end of the shunt may be connected to the condenser 11 as indicated.

In the operation of this embodiment of my device, an energizing power is provided through the primary coil 7 of the transformer 5 by connection to any convenient source of alternating current power. An alternating potential is accordingly developed in the secondaries of the transformer 5. The potential in the coil 9 circulates a current through the filament of the triode 1, heating it to an electron emitting temperature, and the potential in the coil 10 circulates a current through the filament of the triode 2, heating it also to an electron emitting temperature. The potential across the main secondary 8 of the transformer 5 is of course alternating. When the upper end, connected to the plate of the triode 1 is positive, the potential causes a flow of current through the triodes 1 and 2 in series.

If the impedances of the two triodes are substantially the same, no potential difference will exist between the junction point of the filament to plate circuits between the triodes and the midpoint tap on the secondary 8 of the transformer 5, and accordingly no current will flow through the meter which is connected between these points. This condition of equality is readily obtained by adjustment of the respective grid leaks 14 and 15. Upon the passage of current through the meter shunt 17 from the terminals 18, a potential is impressed through the condenser 11 upon the grid of the triode 1. The well known rectifying action produced by the application of alternating potentials to the grid of a triode equipped with grid leak and grid condenser then occurs, changing the grid potential and impedance of the triode 1, and producing a condition of unbalance, resulting in the passage of current through the meter 6 and the production of a meter indication which is proportional to the alternating potential developed between the terminals of the meter shunt 17 and applied to the grid of the triode 1. The current flowing through the meter 6 is then equal to the change in current which would be produced in a single triode under the usual conditions by the same applied grid voltage.

The ordinary triode is, however, very sensitive to changes in the energizing power and if a single one is used alone the changes in plate current produced by the application of an alternating potential to the grid may be entirely obscured by changes in the value of the energizing power.

The change of plate current in a triode with change in plate voltage is indicated in the family of curves of Fig. 2. These curves are plotted to show the change in plate current with change in grid voltage, and the successively higher positions of the successive curves correspond to successively increasing plate voltages. These curves show that while the actual plate current changes by a considerable amount, the rate of change per volt change upon the grid is substantially the same along the middle of the curves over a considerable range of plate voltages. Accordingly, if two triodes are connected as previously disclosed, a change in plate voltage causes a change in the total current flowing therethrough. The triodes are, however, symmetrical and accordingly a change in plate voltage produces an equal change in the current flowing through the two triodes, and accordingly no indication on the connected meter. Likewise since a given change in grid bias produces the same change in plate current in one tube, irrespective of the actual current flowing, a given potential impressed upon the grid of one of the triodes will result in the same change in meter reading, since the meter indicates only the difference in current between the two triodes, regardless of the applied plate voltage, within rather wide limits.

Similarly a change in filament voltage and current affects the plate current in the same manner shown in Fig. 3 in which plate current is plotted against grid voltage for a variety of filament temperatures. The maximum value is obtained at a normal filament current, and an excess of filament current does not change the plate current. However, a decrease in filament current may result in a decrease of electron emission, and accordingly a reduction in plate current. Within certain limits, however, the reduction in plate current does not change the slope of the characteristic curve and accordingly the change in plate current per volt applied to the grid is independent of the filament current. As before, since the triodes are symmetrical, a change in plate current in one cause by a change of filament current and temperature is compensated for by an equal change in the other, and again only the relative change produced by potential upon the grid of one, appears as a reading in the meter.

By this construction, the system becomes independent of variations in the energizing power supply over a considerable range, a range much greater than the variations ordinarily encountered in a commercial power supply. Accordingly the device functions smoothly and accurately without any necessity for a correction for power supply variations. The criterion for the accuracy of the reading then becomes the accuracy with which the tube electrodes retain their relative positions, and the permanence of the grid leak resistors.

The self rectifying construction shown in Fig. 1 is usable only in the event that a very substantial difference in frequency exists between the measured current and the power current, since otherwise troublesome heterodyning effects occur. The operation is satisfactory in instances where a power frequency of 133 to 150 cycles is available, and the current to be measured has a frequency of 25 cycles, or when the energizing power is 60 cycles, and radio frequency values are measured.

To overcome this limitation the power supply may be separately rectified by means of the construction shown in Fig. 4. In this construction triodes 1 and 2 are provided as in Fig. 1 with grid input circuits 3 and 4, a power transformer 5 having a primary coil 7 and a main secondary coil 8 as well as an indicating meter 6, as previously described. The grid circuits may contain grid condensers 11 and 12 as previously described, with grid leaks 14 and 15. The triode 2 is provided as before with a direct connection 16 from the grid condenser to the filament circuit, and the triode 1 is provided with a meter shunt 17 connected between the grid condenser 11 and the filament circuit, and having input leads 18 adapted to be connected to the circuit upon which the measurements are to be made. The triodes 1 and 2 are connected in series as in the embodiment of Fig. 1 and in the essential details the construction so far described corresponds to that of Fig. 1. The power supply is however passed through rectifier tubes 21 and 22. Auxiliary secondary coils are provided in the transformer 5 for heating the filaments. One of the auxiliary secondary coils 23 is connected to the filament of the rectifier tube 21 for heating it to an electron emitting temperature. Another auxiliary secondary 24 is provided for heating the filament of the triode 1. This secondary 24 corresponds to the auxiliary secondary 9 of Fig. 1. A third auxiliary secondary 25 is provided for heating the filament of the triode 2, and a fourth auxiliary coil 26 is provided for heating the filament of the rectifier tube 22.

The upper terminal of the coil 8 is connected to the plate of the rectifier tube 21. The filament circuit of this tube is serially connected to the plate of the triode 1, through a filter choke 27, which desirably consists of a coil and an iron core in the fashion well known in the prior art. The triode 1 is further serially connected to the triode 2 through a second filter choke 28 which is desirably similar to the choke 27. The filament circuit of the triode 2 is serially connected to the plate of the rectifying tube 22 and the filament circuit of this tube is connected through the coil 26 to the terminal of the main secondary 8. This provides a symmetrical series circuit for the four tubes and the secondary 8. The secondary 8 is desirably adjusted in size and number of turns according to the turns in the coil 7, the power supply voltage, the voltage drop in the tubes 21 and 22, and the optimum voltage for the triodes 1 and 2. This will vary according to the characteristics of both the rectifier tubes and of the triodes. The meter is connected, as before, to the midpoint of the coil 8 and the junction point on the circuit between the triodes 1 and 2. This preferably lies also between the filter chokes 27 and 28 in order to minimize the pulsating current flow through the meter 6. In order to obtain a maximum smoothness and accuracy, it is further desirable that smoothing condensers 29 and 30 be connected with the filter chokes 27 and 28. The choke 29 is desirably connected to a point between the rectifier tube 21 and the choke 27, and the mid-point of the coil 8, while the condenser 30 is desirably connected between the filament circuit of the triode 2 and the mid-point of the coil 8. By this construction, a power supply to the triodes 1 and 2 is provided which is substantially free from cyclic pulsations, and at the same time connection points between the primary energy supply and the mid-point of the triode circuit, for the connection of the indicating meter are conveniently available. This construction, as before, is practically completely free from any influence of change of power supply voltage, and it indicates the measured value in a manner strictly analogous to the construction shown in Fig. 1.

It is not of course necessary that an alternating power supply current be used. A direct current supply of any convenient type may be used, as shown in Fig. 5, in which similar numbers indicate similar parts with Fig. 1, which parts perform similar functions. In addition, battery supplies are provided, as indicated, with a midpoint tap for the meter 6. Alternatively, a commercial direct current circuit may be used for the plate power supply. This circuit should desirably provide at least 220 volts of direct current. The mid-point tap for the meter may then be provided by a mid-point connection to a potentiometer resistance connected across the mains, which in turn are respectively connected to the plate of the triode 1, and the filament of the triode. The filaments may desirably be heated by auxiliary batteries, or they may be heated by a portion of the drop across a ballast resistance in a fashion which will be obvious to one skilled in the art, the ballast resistance being connected directly across the power mains, the filament current for the triode 1 then being taken from a point near the center of the ballast resistance, and the filament current for the triode 2 being taken from a portion near the end of the ballast resistance. It is of course obvious that in this embodiment a portion of the current change does not go through the meter but is wasted in the ballast resistance.

The embodiment shown in Fig. 4 may desirably utilize for the triodes 1 and 2, some of the higher quality triodes, preferably those which have a plate current of from 15 to 50 milli-amperes at plate voltages of 150 to 350 volts. With tubes of this size incorporated in the device, a change in plate current of 10 milli-amperes is readily obtained by the application of an alternating current potential through the grid condensers 11, to the grid of the triode 1. The meter 6 is readily made to give a full scale deflection upon a total current of 10 milli-amperes, especially since in this embodiment a relatively high voltage drop is obtainable. The full scale deflection is readily obtainable with an alternating voltage drop between the grid condensers and the filament circuit having a R. M. S. value of from 50 to 300 millivolts. This range is within the practical commercial range for meter shunts.

In some instances it may be found desirable to measure an alternating current of such small value that a voltage drop of this magnitude is unobtainable therefrom. For this purpose, the embodiment shown in Fig. 6 may be utilized. In this embodiment similar numbers represent similar parts with the embodiment shown in Fig. 4, which parts perform similar functions. It is closely similar to that embodiment except that the current to be measured is amplified before being applied to the measuring triodes. Triodes 1 and 2 are provided as before, supplied from a transformer 5 and connected to an indicating meter 6. The transformer has a primary 7 and secondaries 8, 23, 24, 25 and 26. Rectifier triodes 21 and 22 are likewise provided and connected through filter chokes 27 and 28 to the triodes 1 and 2, in parallel with filter condensers 29 and 30. Grid condensers 11 and 12 are provided in the grid circuits of the triodes 1 and 2 and also grid leaks 14 and 15 of suitable value to cause the well known grid leak and grid condenser detecting action to occur in the triodes. Amplifier triodes 31 and 32 are likewise provided and simultaneously supplied from the secondary 8 of the transformer 5 from the rectifier tubes 21 and 22, in parallel with the triodes 1 and 2. The triodes 31 and 32 may desirably be a smaller type of triode than the type utilized for the tubes 1 and 2, and may desirably be of the type adapted to take a plate current of 5 to 8 milliamperes at a plate potential of 90 volts. The triodes 31 and 32 are supplied with plate current in parallel with the triodes 1 and 2 through resistances 33 and 34, which serve as amplifier resistances, and take up a portion of the voltage supplied from the rectifiers 21 and 22. The resistances 33 and 34 are desirably closely similar, and may desirably have a value of about 4,000 to 10,000 ohms. The filaments of the triodes 31 and 32 are desirably supplied with current in parallel with the filaments of the triodes 1 and 2, and the filament current may, if desired, be regulated by auxiliary filament resistances, inserted in the filament circuit in the manner well known in the art. A meter shunt 17 is provided, similar to that in the previously described embodiments and connected by the leads 18 to the source of current to be measured. The voltage drop from the meter shunt 17 may be applied to the grids of the triodes 31 and 32 in either one of two different ways. Grid condensers 35 and 36 may be provided with grid leaks 37 and 38, of a value suitable to bias the grids to a point near the middle of the slope of the characteristic curve to obtain good accuracy of reproduction in the output circuits. Alternatively, the grid condensers and grid leaks may be dispensed with and the grid of triode 31 may be connected directly to the meter shunt, and the grid of triode 32 may be short-circuited, or connected directly to the filament leads.

By this means a very much smaller current may be measured, the triode 31 serves to amplify the input current sufficiently to change the plate current in the triode 1 by an amount great enough to give the desired scale reading upon the meter 6. Simultaneously the grid 32 produces enough change effect upon the grid of the triode 2 to compensate for any irregularities in plate voltage or filament current in the triode 31. Compensation for irregularities in power supply in triode 1 is thus effected in the usual way and any irregularities of power supply in the amplifier triode 31 are similarly compensated for by the triode 32 in its effect on the triode 2. By this embodiment, curves ranging from a R. M. S. value of 5 to 50 millivolts are readily measured.

These embodiments are primarily adapted to the measurement of alternating current. They may however be utilized for the measurement of direct current by omitting the grid leaks and grid condensers, retaining the meter shunts. In such modifications, no rectifying or detecting action is necessary.

It is of course obvious that the usual principles of compensation for temperature changes, etc., of good meter practice may be applied to these systems, including the use of manganin and like material for the shunts, and the balancing of various parts of the circuits against each other. Likewise the usual refinements of good meter practice may be applied to the meter 6, to obtain therein a suitable sensitivity, period, etc.

The foregoing embodiments have been described as adapted to direct reading or indicating meters. It is not of course necessary that they be used only in such forms. The meter 6 may consist of a curve drawing or recording type, as well as the indicating type. It may also be of an integrating type, basically of the ampere-hour form, in which case, if the primary indication is of amperes, the integrated reading will be of ampere-hours, if of watts the reading will be watt-hours, and if of volt-amperes, will be volt-ampere-hours.

By another embodiment it is possible to measure the phase displacement between currents of the same frequency. In this embodiment, illustrated in Fig. 7, a pair of tetrodes 101 and 102 are provided, corresponding to the triodes 1 and 2 of the previously described embodiments. These are connected in series as before, and to a transformer 5 having a primary 7, secondary 8, and auxiliary filament heating secondaries 9 and 10, for power supply as in the previously described devices. A meter 6 of the pattern previously described is provided and connected as before.

The tetrodes 101 and 102 each contain a filament, a plate and two grids. They may be of the usual type, now on the market, with the grids concentric, or they may be of a special type in which the grids are interposed between different parts of the filament and plate, coaxially positioned side by side rather than concentrically one around the other. The grids are each provided with grid condensers, the tetrode 101 having grid condensers 103 and 104, and the tetrode 102 having grid condensers 105 and 106. The grids of the tetrode 101 are connected together at a point between the tube and the condensers and are also connected to the filament circuit through a grid leak 107. The grids of the tetrodes 102 are connected together at a point between the tube and the condensers and are also connected to the grid leaks 108 and 109, as shown, and by them to the filament circuit.

Input transformers are provided, which may be two in number, or may be four in number. If four are chosen they may have or may omit an iron core, depending on the frequency of the connected circuit. In the embodiment shown, four transformers without iron cores are utilized. Current from one of the circuits under test is supplied to the terminals 110, connected to the primaries of the transformers 111 and 112, and from the other circuit to be compared for synchronism or phase displacement, to the primaries of the transformers 115 and 116.

The secondaries of the transformers 111 and 115 are connected through the grid condensers to the grids of the tetrode 101, together. The secondaries of the transformers 112 and 116 are separately connected to the grids of the tetrode 102 through the grid condensers 105 and 106.

In operation, the device of this embodiment receives potential from the two circuits to be compared, and applies the two simultaneously to the two grids of the tetrodes. The comparison currents are applied together with the grids of the tetrode 101 through the transformers 111 and 115, and the condensers 103 and 104, and, the grids being connected, the resultant potential is the vector sum of the two. The same potentials are separately applied to the grids of the tetrode 102 through the condensers 105 and 106, and consequently the effect is that of the arithmetic sum of the two. If the two currents are in phase, the vector sum and the arithmetic sum are the same, the same change in conductance is produced in both tetrodes and no deflection of the meter occurs. If the currents are not in phase the two sums are not the same, do not produce the same change in conductance in the respective tetrodes, and a reading is obtained in the meter 6, which is a function of the phase difference only. The meter may accordingly be calibrated to indicate the phase difference in any convenient terms.

The above described functioning takes place at any desired electrical vibration frequency, such as commercial frequencies, audio frequencies, or radio frequencies.

The above described synchronoscope or phase displacement meter is particularly adapted to use as a member of an aeroplane altitude meter. The plane may be equipped with a short wave generator and radiator system, with a modulator adapted to modulate the output at a convenient lower frequency. A radio receiver is provided adapted to receive the short waves and demodulate them. A synchronoscope as above described is also provided, one of the comparison currents being derived directly from the modulator, and the other from the radio receiver. The modulation frequency may be chosen such that the corresponding wave length is four times the maximum height which it is desired to indicate. The signal is radiated to the ground reflected, received and the modulation frequency of the received signal compared with the original frequency. The phase displacement between the two indicates the portion of a half wave of the modulation frequency reaching to the ground and back, and the modulation wave length being known, the actual height is indicated, and may be given by the calibration of the meter.

Figure 9:
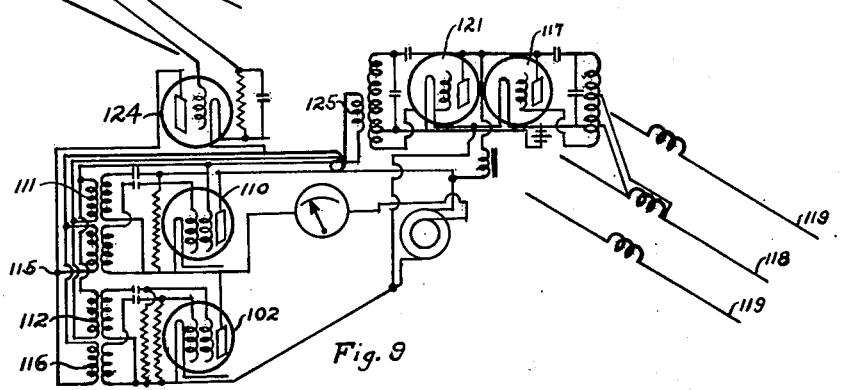
Figure 9 is a diagrammatic showing of the circuits and apparatus of the invention.
Figure 8:
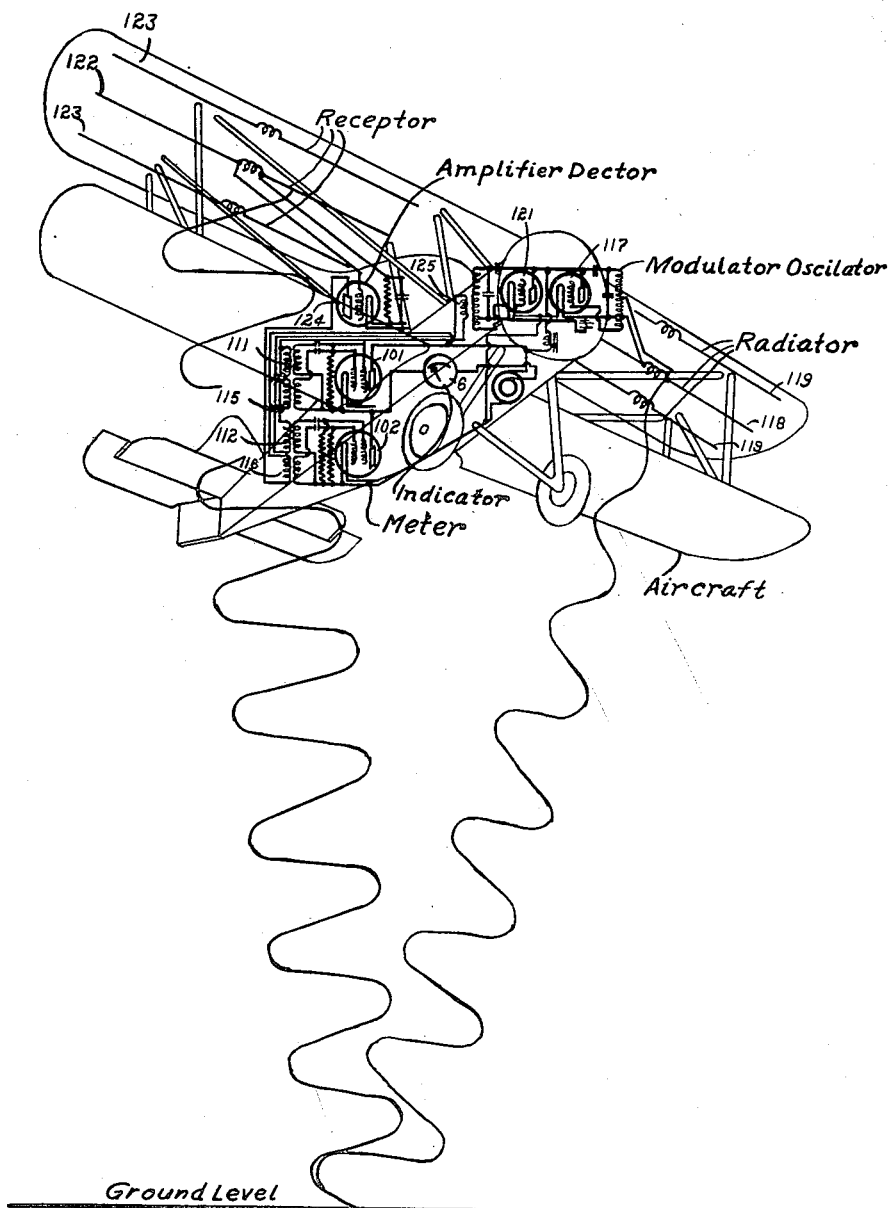
Fig. 8 shows an embodiment including a phase displacement meter for measuring the altitude of an aerial vehicle.

The construction of this device is shown in Fig. 8, in which the outline of an aeroplane is indicated with the apparatus required for the system shown diagrammatically. The apparatus is also illustrated in Fig. 9 on an enlarged scale. This may consist of a triode 117 and associated oscillation generating circuits as shown. An antenna 118, which may desirably be mounted in or on a wing, is supplied with current from the tank circuit of the generator and radiates the signal frequency. Auxiliary antennae 119 may be utilized for their directive properties, and, if the machine is a biplane, another auxiliary antenna may be mounted in the lower wing to serve as a wave channel, for the purpose of still further increasing the directive effect to send the signal energy toward the ground.

A second triode 121, also equipped with oscillation producing circuits is connected with the triode 117 according to a suitable modulation system, here shown as the constant current system.

The triode 117 and its circuits are equipped to generate and radiate comparatively short waves, which may be desirably be within the range of 10 to 200 meters, according to the wavelength allocation. The triode 121 is adapted to generate at a frequency corresponding to a wave length of four times the maximum height which it is desired to measure, which will usually be from 1,000 meters to 20,000 meters—275 kc. to 13.75 kc.

A receiving antenna 122 is also provided, tuned to the same frequency as that of the radiated signals. Auxiliary antenna 123 may also be provided to increase the amount of received signal energy and reduce the possibility of interference from other energy sources, and a wave channel antenna may also be provided if space permits, as in the sending system. A receiving triode 124 is provided, and such other amplifying equipment as may be desired may be included.

The synchronoscope device of the previously described embodiment is also a part of the system, and is so shown, similar numbers indicating similar parts. One of the comparison frequencies is derived directly from the modulator generator 121 by a coil 125, or similar device, connected to one pair of the meter transformers as 111 and 112. The other of the comparison frequencies is derived from the output of the detector triode 124, and is supplied to the other pair of transformers 115 and 116.

Both the oscillator triodes and the detector triode may be supplied with current from any convenient source, as batteries or a suitable generator. The meter tetrodes may also be supplied from batteries, etc., but a convenient source of power is a direct current generator equipped with an armature having an actual electrical mid point in its winding, and a connection thereto through a slip ring contact, the meter terminal being connected to the mid point. This serves as a substitute for the previously described transformer construction, and dispenses with the rectifiers, since the rectification is obtained from the commutator. When such generator is included, it may also be used to supply the plate circuits of all the triodes, and by the addition of appropriate windings, which may be connected to slip rings, it may supply the filaments as well through transformers. It is also desirable that means be included for neutralizing the energy transferred directly from sender to receiver without passing to the ground for reflection, but this means is not shown, since it is well known.

In the operation of this device, the two oscillation generators are energized, and radiate a modulated high frequency signal toward the ground. It is reflected at the ground, returned to the plane, and received. A comparison is then made between a modulation frequency current derived directly from the generator and the modulation frequency which has been carried to the ground and back on a carrier frequency. If the plane is on the ground, there will be practically no phase displacement between the two. If the plane is in the air a displacement will occur of a magnitude proportional to the height above ground. This displacement will show on the meter, which may be calibrated to indicate the actual height above the ground. This system has the substantial advantage that it cannot give a false indication to mislead the pilot, since it will give a reading only when all elements are functioning, and in the event of failure of any member, it reads zero, thereby warning the pilot that something is wrong, and that he cannot secure height readings from it. It may be noted also that all questions of phase relationships in the carrier frequency are without effect on the readings, since the carrier serves merely to transport the measuring frequency to the ground and back, and any changes in phase relation due to reflection at the ground, or influences in the radio circuits can only affect the radio frequency, and cannot affect the measuring frequency.

The maximum altitude reading and the accuracy of measurement at low altitudes are interrelated, requiring a low maximum reading when accuracy at low altitudes is required. To avoid this limitation, the modulating oscillator may be provided with a plurality of interchangeable coils for various frequencies, or adjusting means, the adjustment being mechanically interlocked with an adjustable plural scale on the meter, so arranged that for high accuracy at low elevations a comparatively high modulation frequency is used. Then when higher altitudes are reached, the frequency is reduced, and the scale changed to correspond.

A particularly valuable and important portion of the invention here disclosed is the distance measuring, or altimeter system of Figure 8.

This embodiment of the invention is designed primarily to show distance of separation between two points and to show particularly the actual altitude of an aerial vehicle above ground level. This may be accomplished by a direct radiation of Hertzian waves in a direction normal to the ground surface and the reflection backward to the vehicle in a similar normal direction. It will be obvious that various types of ground surface and various types of structures upon the ground surface will modify the reflecting power of the earth, and will alter and modify the depth of penetration of the radio waves into the ground before reflection is completed. However, for the ordinary moist terrain or sea water, the reflection occurs so nearly at the surface that little or no error in altitude indication is produced; or better, the error is wholly negligible or may be compensated for by the usual adjustment of zero reading on the indicator scale.

Alternatively, the directive antennae on the radiating portion of the structure may be modified in position in such a way as to throw the radiated energy forward at a convenient angle, which may be 45° from the normal, or usually will preferably be 60° from the normal. The reflection at the point of incidence of the radio energy upon the ground surface yields a scattering of energy which sends enough energy back to the receiving portion of the structure to be effective, even though the major portion of the radiated energy is reflected on ahead of the vehicle and is not received by the receiving antennae and its associated structures. This arrangement of members does not give the true normal altitude of the plane, but it gives a much more valuable indication; it indicates the presence of obstacles ahead of and somewhat below the plane which is a far more valuable indication than merely the normal linear altitude since it will show the presence of obstacles ahead of the plane, and may readily be made to show obstacles such as hills, knolls or mountains at a distance as great as from 5,000 to 25,000 feet.

The structure is also valuable for other distance measurements such as subterranean or submarine prospecting. Each different geological strata in the earth has a different di-electric constant and especially is this the case with ore bodies which are of a density higher than normal rock and with oil bodies which are of much lower density. Accordingly, the structure of the invention either mounted upon an airplane as indicated in Figure 8 or dismounted for more convenient use in rough terrain may be used for subterranean prospecting by radiating the Hertzian waves downward into and through the ground. The radiated waves pass downward to a geological plane of major change in mineral density. The change in density produces a reflecting surface or plane by which a substantial portion of the waves are reflecter; and this reflection occurs wherever the change in density is from a medium density to a higher density as occurs with ore bodies or to a lower density as occurs with oil bodies. The reflected waves are returned to the receiving antennae and its associated members and indicate the depth of desired body whether ore or oil.

The embodiment of Figure 8 utilizes a pointer to indicate the altitude or depth and when used for subterranean prospecting gives only one indication, which is the depth at which the most powerful reflective plane of geological change occurs.

Alternatively, the indicating meter may be replaced by an oscillograph tube which will show the presence of a plurality of reflecting planes and will indicate both the depth and by the relative magnitude will indicate the reflecting power of the geological plane. This difference in reflecting power can be interpreted to indicate approximately the type of material forming the geological reflecting plane. It may be observed that the absorption of energy by the ground in such subterranean exploration is very high and accordingly a much more powerful transmitter and a much more sensitive receiver are required than is the case for the airplane altimeter above presented.

The embodiment may similarly be used for submarine sounding since the major reflecting plane is at the ocean bottom. It may be also be used for submarine prospecting since a portion of the radiated energy passes on below the ocean bottom into the geologic sub-strata and is still further reflected from geologic planes thereunder and upon return and reception by the receiving antennae may be utilized in an analogous manner for the determination of the presence of ore or oil below the sea bottom.

Thus the altimeter embodiment of this invention provides a particularly useful structure for measurement of altitude, measurement of distance to objects to be approached and for subterranean and submarine prospecting.

While there are above described but a limited number of embodiments of the device of this invention, it is possible to produce still other embodiments of the inventive concept in accordance with the spirit disclosed, and it is accordingly desired that only such limitations be imposed on the appended claims as are stated therein, or required by the prior art.

What is claimed is:

1. A measuring instrument comprising a radio transmitting system, having an amplitude modulating member, a radio receiving system having a modulation detector and means connected to said modulating member and said modulation detector for comparing the phase relationships between the modulations of the radiated wave and the received wave from the transmitting system after reflection from a remote surface.

2. A measuring instrument comprising a radio transmitting system, a modulator connected thereto, a radio receiving system and a phase relationship indicating device connected to and receiving energy from both modulator and receiver and indicating distance in terms of energy phase characteristic comparisons of the modulation envelopes.

3. A measuring instrument comprising a radio transmitting system, a directive antennae structure connected thereto, a modulator connected thereto, a radio receiving system and an indicating device connected to and receiving energy from both modulator and receiver and indicating distance in terms of energy phase characteristic comparisons of the modulation envelopes.

4. A measuring instrument comprising a radio transmitting system, a directive antennae structure connected thereto, a modulator connected thereto comprising means for producing a wave length equal to approximately four times the maximum distance to be measured, a radio receiving system and an indicating device connected to and receiving energy from both modulator and receiver and indicating distance in terms of comparisons of the phase relationships of the modulation envelope.

5. An aerial altimeter structure comprising a radio transmitting system attached to an aerial vehicle to indicate altitude thereof and comprising an oscillator device, a modulator device connected thereto for the control thereof, a directive antennae system also mounted upon the aerial vehicle, a radio receiving system, also carried upon said aerial vehicle adjacent said radio transmitting system including an antennae system and an amplifier system including a modulation detector connected to said antennae system and a phase relationship measuring device connected to said radiating system and to said receiving system responsive simultaneously to the modulation from said modulator device, and the modulation detected by said amplifier system to determine the phase relationship in terms of distance from a radio-frequency reflecting surface.

6. An aerial altimeter structure comprising a radio transmitting system attached to an aerial vehicle and comprising an oscillator device, a modulator device for the control of the oscillator device, a directive antennae system also mounted upon the aerial vehicle, a radio receiving system including a modulation detector also carried upon said aerial vehicle adjacent said radio transmitting system including an antennae system and an amplifier system and a phase displacement measuring device connected to the modulator of said radiating system and to the modulation detector of said receiving system to indicate distance in terms of phase displacement.

7. An aerial altimeter structure comprising a radio transmitting system attached to an aerial vehicle and comprising an oscillator device including members for adjusting the wave length to a relatively short wave length between approximately one meter and twenty meters, a modulator device connected thereto for the modulation control thereof, a directive transmitting antennae system also mounted upon the aerial vehicle, a radio receiving system also carried upon said aerial vehicle adjacent said radio transmitting system including an antennae system, a modulation detector and an amplifier system connected thereto, and a phase relationship measuring device connected to said radiating system and said receiving system to indicate the altitude of said vehicle in terms of modulation phase relationship.

8. An aerial altimeter structure comprising a radio transmitting system attached to an aerial vehicle and comprising an oscillator device including members for adjusting the wave length to a relatively short wave length between approximately one meter and twenty meters, a modulator device connected thereto for the control thereof, a directive transmitting antennae system also mounted upon the aerial vehicle, a radio receiving system also carried upon said aerial vehicle adjacent said radio transmitting system including an antennae system, a modulation detector and an amplifier system connected to said second antennae system and a phase displacement measuring device connected to the modulator of said radiating system and the detector of said receiving system for indicating the altitude of said aerial vehicle.

9. An aerial altimeter structure comprising a radio transmitting system attached to an aerial vehicle and comprising an oscillator device including members for adjusting the wave length to a relatively short wave length between approximately one meter and twenty meters, a modulator device connected thereto for the control thereof including members for adjusting the wave length of the modulator oscillation to a value approximately four times the maximum altitude to be measured, a directive antennae system also mounted upon the aerial vehicle, a radio receiving system also carried upon said aerial vehicle adjacent said radio transmitting system including an antennae system, a modulation detector and an amplifier system connected to said second antennae system and a phase displacement measuring device connected to the modulator of said radiating system and to the modulation detector of said receiving system to indicate the altitude of said aerial vehicle.

10. An aerial altimeter structure comprising a radio transmitting system attached to an aerial vehicle and comprising an oscillator device including members for adjusting the wave length to a relatively short wave length between approximately one meter and twenty meters, a modulator device connected thereto for the control thereof including members for adjusting the wave length of the modulator oscillation to a value approximately four times the maximum altitude to be measured, a directive transmitting antennae system also mounted upon the aerial vehicle and means for controlling the direction of operation of the directive antennae system to a direction normal to the earth's surface, a radio receiving system also carried upon said aerial vehicle adjacent said radio transmitting system including a receiving antennae, a modulation detector and an amplifier system connected to said receiving antennae and a phase relationship measuring device connected to the modulator of said radiating system and the modulation detector of said receiving system for indicating the altitude of said vehicle.

11. An aerial altimeter device comprising a radio transmitting system attached to an aerial vehicle and comprising an oscillator member including means for adjusting the wave length to a relatively short wave length between approximately one meter and twenty meters, a modulator device connected thereto for the control thereof including members for adjusting the wave length of the modulator oscillation to a value approximately four times the maximum altitude to be measured, a directive transmitting antennae system also mounted upon the aerial vehicle and operative at an angle between 30° and 60°, a radio receiving system also carried upon said aerial vehicle adjacent said radio transmitting system including an antennae system, a modulation detector and an amplifier system connected to said second antennae system and a phase relationship measuring device connected to the modulator device of said radiating system and to the modulation detector of said receiving system to indicate the altitude of the aerial vehicle.

12. An aerial altimeter structure comprising a radio transmitting system attached to an aerial vehicle and comprising an oscillator device including members for adjusting the wave length to a relatively short wave length between approximately one meter and twenty meters, a modulator device connected thereto for the control thereof including members for adjusting the wave length of the modulator oscillation to a value approximately four times the maximum altitude to be measured, a directive transmitting antennae system also mounted upon the aerial vehicle, a radio receiving system also carried upon said aerial vehicle adjacent said radio transmitting system including a directive antennae system, a modulation detector and an amplifier system connected to said directive receiving antennae system and a phase relationship measuring device connected to said radiating system and to said receiving system to indicate the altitude of said aerial vehicle.

13. An aerial altimeter structure comprising a radio transmitting system attached to an aerial vehicle and comprising an oscillator device including members for adjusting the wave length to a relatively short wave length between approximately one meter and twenty meters, a modulator device connected thereto for the control thereof including members for adjusting the wave length of the modulator oscillation to a value approximately four times the maximum altitude to be measured, a directive transmitting antennae system also mounted upon the aerial vehicle connected to said oscillator, a radio receiving system also carried upon said aerial vehicle adjacent said radio transmitting system including a directive receiving antennae system, a modulation detector and an amplifier system connected to said directive receiving antennae system and a measuring device comprising a synchronoscope connected to the modulator of said radiating system and to the modulation detector of said receiving system to indicate the altitude of the aerial vehicle.

14. An aerial altimeter structure comprising a radio transmitting system attached to an aerial vehicle and comprising an oscillator device including members for adjusting the wave length to a relatively short wave length between approximately one meter and twenty meters, a modulator device connected thereto for the control thereof including members for adjusting the wave length of the modulator oscillation to a value approximately four times the maximum altitude to be measured, a directive transmitting antennae system also mounted upon the aerial vehicle and connected to said oscillator, a radio receiving system also carried upon said aerial vehicle adjacent said radio transmitting system including a directive receiving antennae system, a modulation detector and an amplifier system connected to said directive receiving antennae system and a measuring device comprising a synchronoscope having an indicating pointer and scale calibrated in terms of altitude and connected to the modulator of said radiating system and to the modulation detector of said receiving system to indicate the altitude of the aerial vehicle.

15. An aerial altimeter structure comprising a radio transmitting system attached to an aerial vehicle and comprising an oscillator device including members for adjusting the wave length to a relatively short wave length between approximately one meter and twenty meters, a modulator device connected thereto for the control thereof including members for adjusting the wave length of the modulator oscillation to a value approximately four times the maximum altitude to be measured, a directive transmitting antennae system also mounted upon the aerial vehicle and connected thereto, a radio receiving system also carried upon said aerial vehicle adjacent said radio transmitting system including a directive receiving antennae system, a modulation detector and an amplifier system connected to said directive receiving antennae system and a measuring device comprising a synchronoscope comprising a cathode ray oscilloscope connected to the modulator of said radiating system and to the modulation detector of said receiving system to indicate the altitude of the aerial vehicle.

16. In an altimeter device, means for radiating a modulated radio frequency toward a reflecting plane, means for receiving reflected modulated energy and detecting the modulation and means for comparing the phase relationship of the modulation of the reflected energy with the phase of the modulation of the radiated energy comprising a synchronoscope connected to the modulation member of said radiating means and to the modulation detecting means of the receiving means to indicate separation distance.

17. In an altimeter device, means for radiating a modulated radio frequency toward a reflecting plane, means for receiving reflected modulated energy from said plane, and means for comparing the phase relationship between the modulation of the reflected energy and the modulation of the radiated energy comprising a synchronoscope connected to the modulating means and the reflected energy modulation detecting means calibrated in units of distance.

18. A prospecting system comprising a radio transmitting system including a modulator adapted to be placed adjacent the earth's surface and to radiate modulated Hertzian waves into the earth, a radio receiving system also placed upon the earth's surface and arranged to receive and detect modulated energy reflected in the earth from said transmitting system and means for comparing the phase of the radiated energy and received energy connected to said modulator and said detecting receiver to indicate the distance to the reflecting locus in the earth.

19. A prospecting system comprising a radio transmitting system including a modulator adapted to be placed adjacent the earth's surface and to radiate modulated Hertzian waves into the earth, a radio receiving system also placed upon the earth's surface and arranged to receive and detect modulated energy reflected in the earth from said transmitting system and means for comparing the phase of the radiated energy and the received energy connected to said modulator and said detecting receiver, to indicate the distance to the reflecting locus in the earth comprising a synchronoscope calibrated in distance units.

20. A prospecting system comprising a radio transmitting system including a modulator adapted to be placed adjacent the earth's surface and to radiate modulated Hertzian waves into the earth, a radio receiving system also placed upon the earth's surface and arranged to receive and detect modulated energy reflected in the earth from said transmitting system and means for comparing the phase of the radiated energy and the received energy connected to said modulator and said detecting receiver, to indicate the distance to the reflecting locus in the earth comprising a cathode ray synchronoscope calibrated in distance units.

HARRIS D. HINELINE.